(No Model.) 2 Sheets—Sheet 1.

J. STUBBS.
PROCESS OF BURNING CLAY FOR PAVING MATERIAL.

No. 419,977. Patented Jan. 21, 1890.

Witnesses
Wm A. Skinkle
G. R. Richards.

Inventor
Jesse Stubbs,
By his Attorney
W. P. Richards.

(No Model.) 2 Sheets—Sheet 2.

J. STUBBS.
PROCESS OF BURNING CLAY FOR PAVING MATERIAL.

No. 419,977. Patented Jan. 21, 1890.

Witnesses
Wm. A. Skinkle
S. R. Richards

Inventor
Jesse Stubbs
By his Attorney
J. R. Richards

UNITED STATES PATENT OFFICE.

JESSE STUBBS, OF MOUNT PLEASANT, IOWA.

PROCESS OF BURNING CLAY FOR PAVING MATERIAL.

SPECIFICATION forming part of Letters Patent No. 419,977, dated January 21, 1890.

Application filed June 1, 1889. Serial No. 312,912. (No model.)

*To all whom it may concern:*

Be it known that I, JESSE STUBBS, a citizen of the United States, residing at Mount Pleasant, in the county of Henry and State of Iowa, have invented certain new and useful Improvements in the Method of Burning Clay for Paving Material, for Ballast, and for other Uses, of which the following is a specification.

The object of my invention is to produce from ordinary clay or other suitable earths while in the condition said clay or earth is in when thrown by shoveling from its bed a vitrified, partially-vitrified, or hard-burned material suitable for paving roads, for ballast for railroad-tracks, and other purposes, and this object I accomplish by a continuous method of building and burning over flues or trenches at both sides of or at either side of a prepared heap or pile of clay and fuel, all as hereinafter fully described.

In order to explain more fully my method of preparing and burning clay for the purposes described, I will refer to the accompanying drawings, which form part of this specification, and in which—

Figures 1, 2:
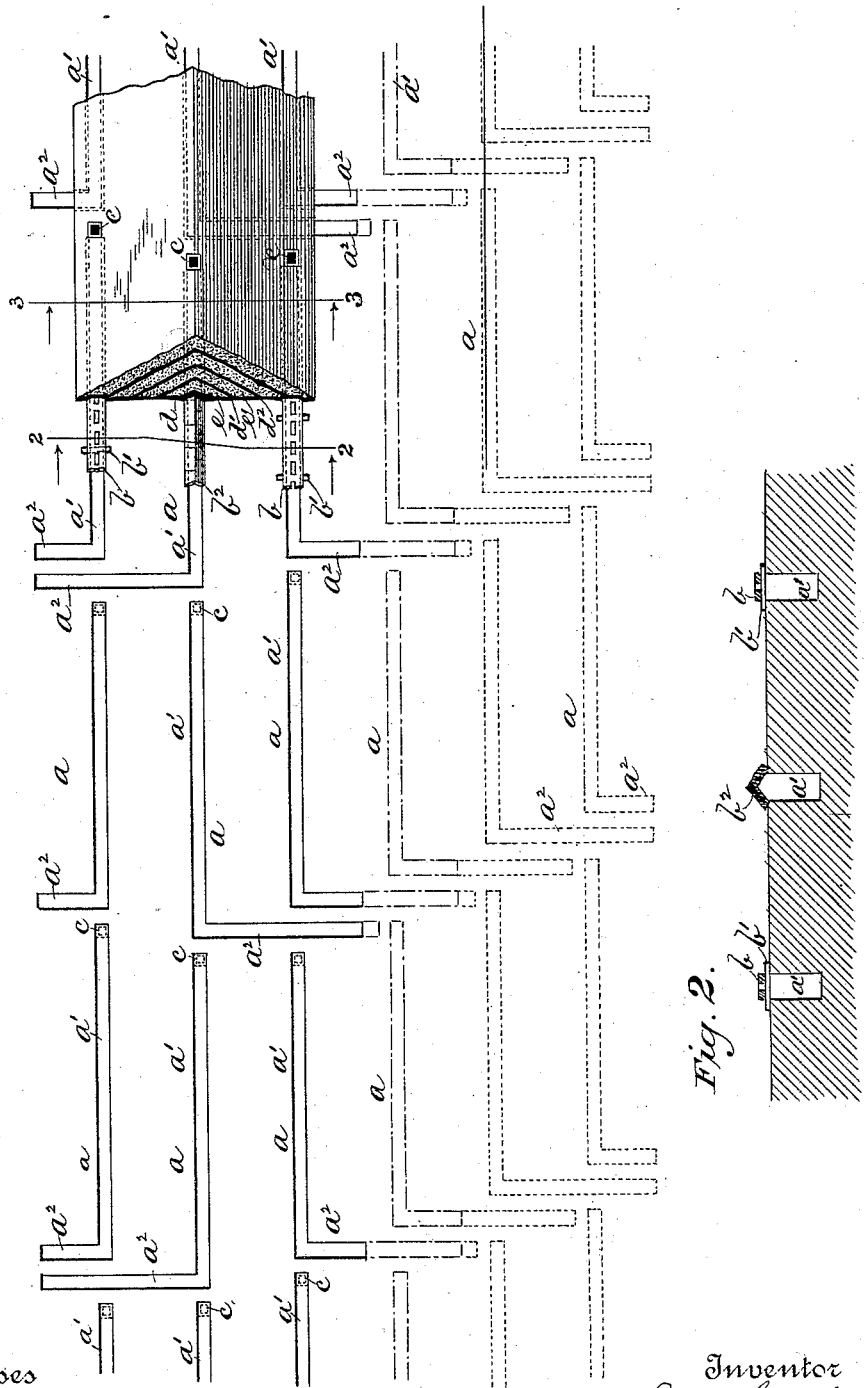
Figure 3:
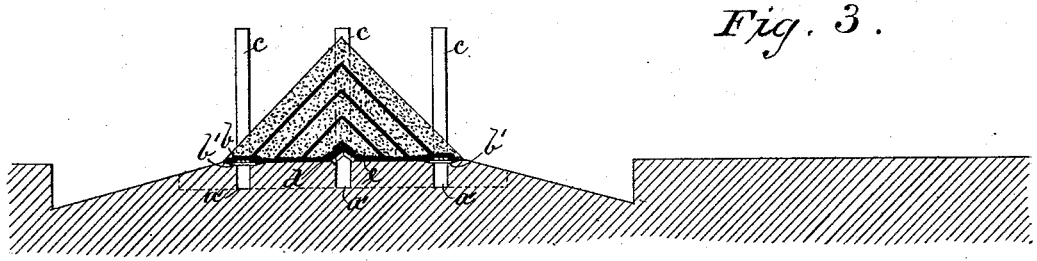
Figure 4:
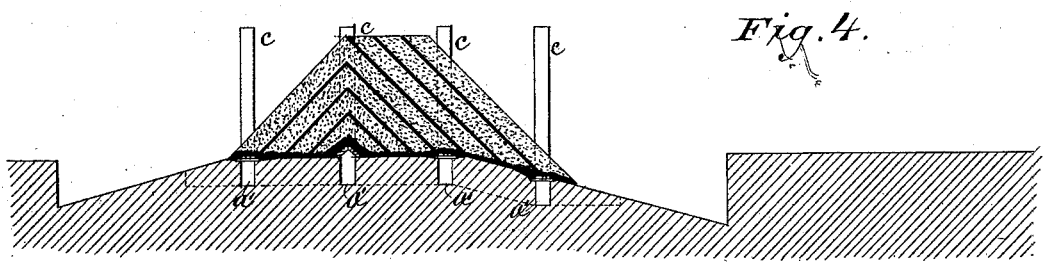
Figure 5:
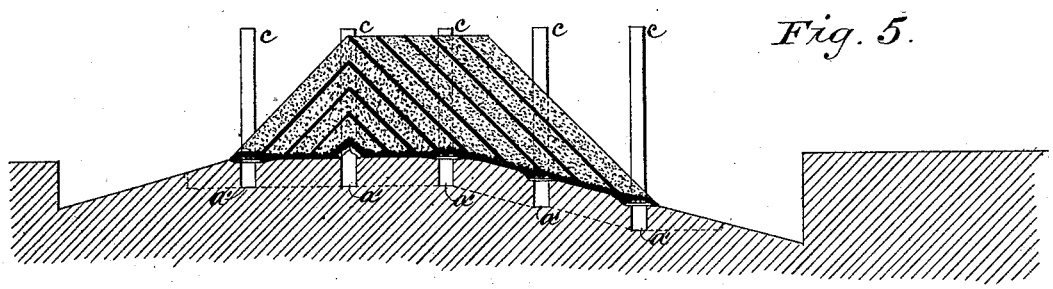
Figure 6:
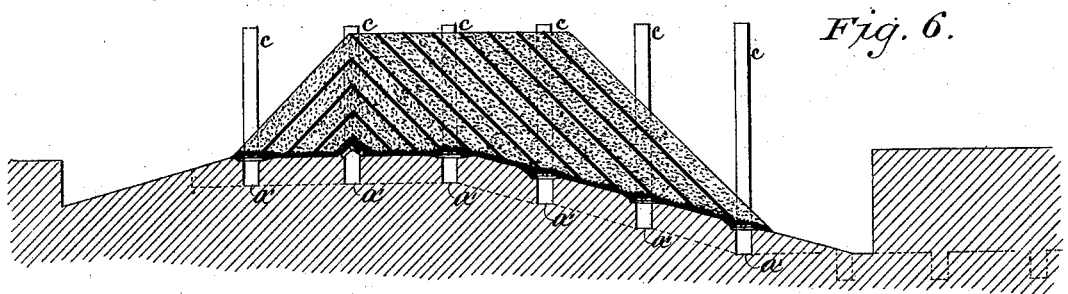

Figure 1 is a top plan of the trench-flues used in commencing a kiln and part of a commenced kiln in full lines and a series of following trench-flues in dotted lines; Fig. 2, a sectional elevation of the preliminary trench-flues in the line 2 2 in Fig. 1. Fig. 3 is a sectional elevation in same plane as Fig. 2, but showing further than said Fig. 2 a sectional elevation of the beginning of the kiln and of the adjacent clay partly removed for forming the material for ballast. Figs. 4, 5, and 6 are sectional elevations in same plane as Fig. 3, and show, respectively, successive steps in my method or process.

In commencing my process of burning I select clay as nearly as possible where it is to be used. I then form trench-flues $a$ with parallel parts $a'$ and lateral parts $a^2$ by digging or removing the clay. The parts $a'$ of the trench-flues I prefer to have from three feet to six feet apart, depending on the condition of the clay—the drier the clay the nearer the trenches should be to each other. The parts $a^2$ should be six to nine feet apart. These trench-flues I prefer about ten to twelve inches deep and about four to six inches wide, and they may be covered by perforated boards $b$, supported on transverse sticks $b'$, as shown at two of said flues at Figs. 1 and 2, or by sods $b^2$, placed as shown at one of them at same figure.

In commencing to burn or form the kiln the outer ends of the lateral trench-flues $a^2$ are left open, and at the end of each trench-flue $a'$, I prefer a vertical flue $c$, formed either by standing a stake at that point, around which stake the material is placed, and which can be withdrawn upwardly to leave the open flue $c$, or these flues can be formed by carefully placing the clay to form them, and if need be by pressing clay into rough but suitable plates for the purpose. These vertical flues $c$ can be dispensed with, if preferred.

Before covering the trench-flues they should first, preferably, have a fire kindled in them where covered with sods, preferably of coal and wood, to thoroughly dry them out, and then a small fire kindled in each and the cover placed thereon immediately before placing the clay and fuel thereover. When the trench-flues are covered with the boards, it is preferable to not place any fire in the trenches, and to cover the boards with lumps of clay before a fire is started over them. Slack coal $d$ is then placed over about three of the trench-flues $a'$ to a depth of about one inch, and then clay $e$ in an inclined position is placed over the middle one of said three trenches, as shown at Figs. 1 and 3. An inclined layer of slack coal $d'$ is then placed over the clay $e$, and over this another inclined layer of clay $e'$, and over this another inclined layer of coal $d^2$. The layers of clay should be about six to eight inches thick, and the coal layers one-half to one inch thick, and should be continued until two more of the trench-flues $a'$ are covered therewith, or, say, three altogether, when the kiln will be found to be of about the best practical height for burning and operating to best advantage, and will be about as partly shown at Fig. 1 and as shown in section at Fig. 3, with the ends of the laterals $a^2$ uncovered, so as to admit air. As the burning progresses, these ends $a^2$ may be closed or opened, as found necessary, to promote or retard the operation of burning in any section included over either trench $a$. A new series of trenches $a$ may then be made on either or both sides of the kiln, as shown on one side thereof by dotted lines at Fig. 1, only one series, however, being made at a time, as shown at Fig. 4, where the new trench is added, the fuel and clay placed in inclined layers thereover, and the clay taken from the adjoining clay, as shown.

Fig. 4 shows the addition of another series of trenches and the alternate and inclined layers of fuel and clay thereover. Fig. 5 shows the addition of still another series of trenches and the alternate and inclined layers of fuel and clay thereover. Fig. 6 shows the addition of still another series of trenches and the alternate and inclined layers of fuel and clay thereover.

Prior to building or placing each alternate layer of fuel and clay the last-formed layer can be raked off slightly at its lower end to expose coals or heated clay, which can be raked out slightly to commence building the next layers on and for the purpose of firing them. The lateral arms $a^2$ of part of the last trenches will always extend outwardly beyond the side of the kiln and where the draft through them can be controlled, as hereinbefore described, and the burning be thereby greatly improved. As the trenches and kiln are extended laterally, the clay will be taken from an increased lower depth, as shown at Figs. 3 to 6, both inclusive, until such depth is reached, as shown at Fig. 6, where the clay may be taken from a level such as can be drained, and will furnish sufficient clay to build the kiln as high as desired, and the clay still be furnished near enough to the kiln to be readily shoveled thereonto. These inclined layers of fuel and clay will both, as they become heated, expand, and thereby increase the draft to such an extent that the vertical flues $c$ may be dispensed with. I prefer, however, to use these flues $c$ in starting the kiln, and especially the first three series of flues $a$, as shown at Figs. 1 and 3, and when used a cover can be placed on their upper ends, if preferred, to aid in regulating the draft.

The flues $a$ can be made of other forms than what I have shown and still answer the purpose for which I intend them—that is, to furnish draft to the kiln by a number or series of trench-flues located beneath small areas of the kiln in such manner that the material can be burned uniformly, and not, as is generally done, be burned too little at one part of the kiln while vitrified into large and almost useless masses at other parts of the kiln, and which have to be broken up at much expense before fit for use.

When necessary to temporarily stop burning at any time, the last-placed inclined layer of clay will furnish protection for the side of the kiln, and a layer can be thrown up against each end of the kiln for the same purpose.

I do not claim herein anything except the method or process involved in the invention herein described. The kiln, including the flues, is made the subject-matter of another application filed concurrently herewith, Serial No. 312,913.

Having thus described my invention, what I claim as new, and desire to secure by Letters Patent, is—

1. The method herein described of burning clay as it is spaded or thrown from its bed or pit for road-paving, railroad-ballast, and for other purposes, which consists in forming or excavating a few short trench-flues in the ground, covering them, making a fire over them and between them, building the first part of the kiln over the fire in inclined layers of clay and fuel, as shown and described, making further trenches and covering them, and raking the preceding and burning layers of clay and fuel to procure fire beneath the succeeding layers of clay and fuel and over the last-described trenches and with which to fire said last-recited layers of clay and fuel inclined as described, substantially as described.

2. The method herein described of burning clay as it is spaded or thrown from its bed or pit for road-paving for railroad-ballast, and for other purposes, which consists in forming or excavating a few short trench-flues in the ground, covering them, making a fire over and between them, building the first part of the kiln over said fire in inclined layers alternating of clay and fuel, as shown and described, making further flue-trenches and covering them, raking the preceding and burning alternate layers of clay and fuel to procure fire on which to build the succeeding inclined and alternating layers of clay and fuel and over the last-described flue-trenches, and with which to fire said last-recited layers of clay and clay and fuel, and closing, as required, the open outer ends of the flue-trenches to more perfectly control the draft, substantially as described.

3. The method herein described of burning clay as it is spaded or thrown from the pit or bed for road-paving, for railroad-ballast, and for other purposes, which consists in forming or excavating in the ground a few flue-trenches $a$, having main branches $a'$ and lateral branches $a^2$, covering them, making a fire over them, building a kiln of inclined and alternating layers of clay and fuel over said flue-trenches, making additional flue-trenches $a$, and raking the preceding inclined layers of clay and fuel to procure fire beneath succeeding inclined and alternate layers of clay and fuel and over the last-described flue-trenches and with which to fire said inclined layers of clay and fuel, the inclined layers of clay and fuel to be built so as to leave the ends of the flue-trenches $a^2$ always open, so that they can be covered to check the draft in their respective flues $a'$ $a^2$, substantially as described.

4. The method herein described of burning clay as it is spaded or thrown from its bed or pit for road-paving, railroad-ballast, and for other purposes, which consists in forming or excavating a few short trench-flues in the ground with a vertical trench-flue c at the inner end of each, covering said trench-flues, making a fire over them and between them, building the first part of the kiln over said fire and in inclined alternating layers of clay and fuel, as shown and described, making further flue-trenches and covering them, and raking the preceding and burning layers of clay and fuel to procure fire beneath additional inclined layers of clay and fuel and over the last-recited trench-flues, except their outer ends, and with which to fire said last-recited inclined layers of clay and fuel, substantially as described.

In testimony whereof I affix my signature in presence of two witnesses.

JESSE STUBBS.

Witnesses:
FORREST F. COOKE,
H. M. RICHARDS.